(12) United States Patent
Sitdikov et al.

(10) Patent No.: US 12,481,908 B2
(45) Date of Patent: Nov. 25, 2025

(54) PERFORMING QUANTUM ERROR MITIGATION AT RUNTIME USING TRAINED MACHINE LEARNING MODEL

(71) Applicant: International Business Machines Corporation, Armonk, NY (US)

(72) Inventors: Iskandar Sitdikov, New York, NY (US); Haoran Liao, El Cerrito, CA (US); Seyed Alireza Seif Tabrizi, Adelphi, MD (US); Zlatko Kristev Minev, White Plains, NY (US); Derek Wang, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 18/243,220

(22) Filed: Sep. 7, 2023

(65) Prior Publication Data
US 2025/0086492 A1   Mar. 13, 2025

(51) Int. Cl.
*H03M 13/00* (2006.01)
*G06N 10/20* (2022.01)
*G06N 10/70* (2022.01)

(52) U.S. Cl.
CPC ............. *G06N 10/70* (2022.01); *G06N 10/20* (2022.01)

(58) Field of Classification Search
CPC ................................ G06N 10/70; G06N 10/20
See application file for complete search history.

(56) References Cited

U.S. PATENT DOCUMENTS

| | | | |
|---|---|---|---|
| 11,720,430 B2 * | 8/2023 | Rhee ...................... | G06N 10/70 |
| | | | 714/2 |
| 11,966,707 B2 * | 4/2024 | Cao ......................... | G06F 40/40 |
| 2022/0245500 A1 * | 8/2022 | Montanaro ............ | G06N 20/00 |
| 2023/0044102 A1 * | 2/2023 | Anderson .............. | G06N 20/20 |
| 2023/0121176 A1 | 4/2023 | Zhang et al. | |

(Continued)

OTHER PUBLICATIONS

Lowe et al., "Unified Approach to Data-Driven Quantum Error Mitigation," Physical Review Research 3, Article No. 033098, 2021, pp. 1-12.

(Continued)

*Primary Examiner* — Esaw T Abraham
(74) *Attorney, Agent, or Firm* — Shackelford, McKinley & Norton, LLP; Robert A. Voigt, Jr.

(57) ABSTRACT

A method, system, and computer program product for runtime quantum error mitigation. Training data, which includes noisy expectation values and target expectation values (noiseless expectation values), is generated. A machine learning model is then trained using the training data to perform quantum error mitigation based on learning the relationships between target and noisy expectation values. That is, such a machine learning model is trained to generate target expectation values based on inputted noisy expectation values. Upon executing a quantum circuit on a quantum computer creating quantum results, quantum error mitigation is performed on the quantum results at runtime using the trained machine learning model. In this manner, there are significant savings in quantum execution time while improving the accuracy of the results in performing quantum error mitigation on quantum results at runtime without additional mitigation circuits.

25 Claims, 7 Drawing Sheets

(56) References Cited

U.S. PATENT DOCUMENTS

2023/0177377 A1\* 6/2023 Oh .................... G06N 3/084
                                                716/100
2024/0127102 A1\* 4/2024 Maksymov ............ G06N 10/70

OTHER PUBLICATIONS

Cincio et al., "Machine Learning of Noise-Resilient Quantum Circuits," PRX Quantum 2, Article No. 010324, 2021, pp. 1-19.
Czarnik et al., "Improving the Efficiency of Learning-Based Error Mitigation," arXiv:2204.07109V1, Apr. 4, 2022, pp. 1-13.
Czarnik et al., "Error Mitigation with Clifford Quantum-Circuit Data," arXiv:2005.10189v3, Nov. 16, 2021, pp. 1-16.
Kim et al., "Quantum Error Mitigation with Artificial Neural Network," IEEE Access, vol. 8, 2020, pp. 188853-188860.

\* cited by examiner

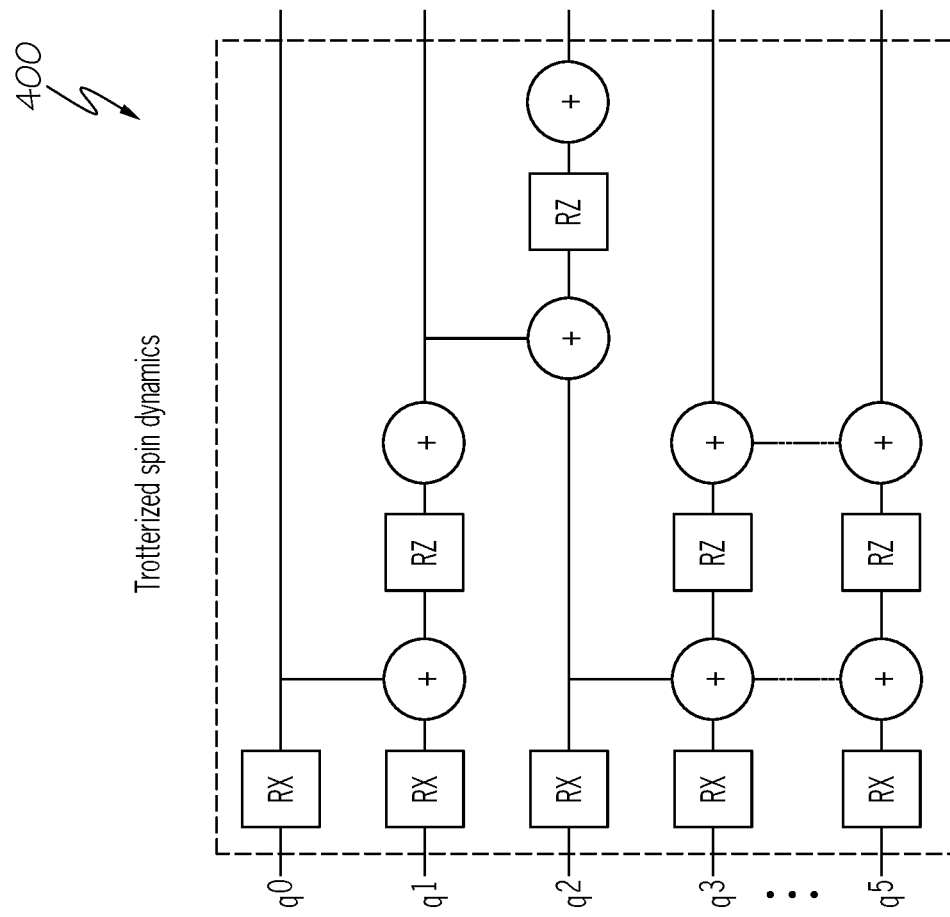
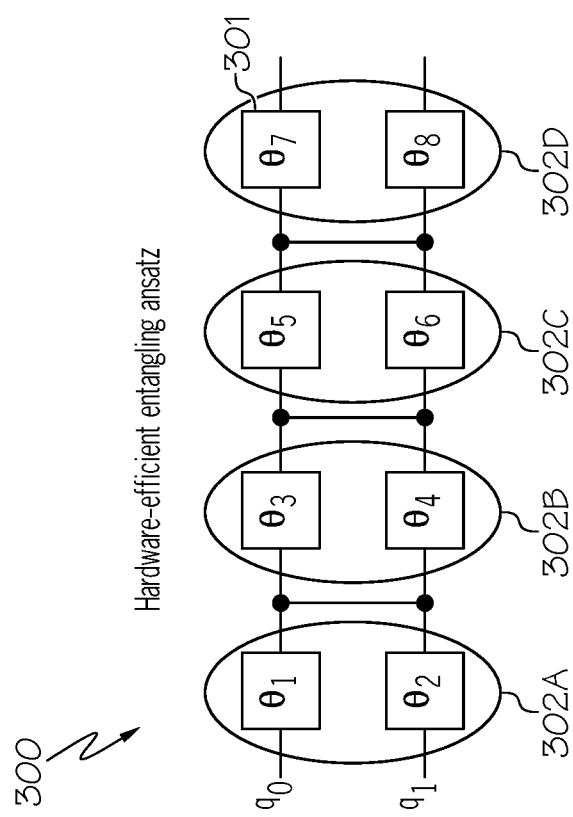
FIG. 4
FIG. 3

PERFORMING QUANTUM ERROR MITIGATION AT RUNTIME USING TRAINED MACHINE LEARNING MODEL

TECHNICAL FIELD

The present disclosure relates generally to quantum error mitigation techniques, and more particularly to performing quantum error mitigation at runtime using a trained machine learning model.

BACKGROUND

Quantum computing is a rapidly-emerging technology that harnesses the laws of quantum mechanics to solve problems too complex for classical computers. A quantum computer is a computer that exploits quantum mechanical phenomena. At small scales, physical matter exhibits properties of both particles and waves, and quantum computing leverages this behavior, specifically quantum superposition and entanglement, using specialized hardware that supports the preparation and manipulation of quantum states. Classical physics cannot explain the operation of these quantum devices, and a scalable quantum computer could perform some calculations exponentially faster than any modern "classical" computer.

Current quantum hardware, however, is subject to different sources of noise, the most well-known being qubit decoherence, individual gate errors, and measurement errors. These errors limit the depth of the quantum circuit (i.e., the number of "layers" of quantum gates, executed in parallel, it takes to complete the computation defined by the quantum circuit) that can be implemented. However, even for shallow circuits, noise can lead to faulty estimates. Fortunately, quantum error mitigation provides a collection of tools and methods that allow one to evaluate accurate expectation values (probabilistic expected values of the quantum circuit) from noisy, shallow depth quantum circuits, even before the introduction of fault tolerance.

Quantum error mitigation refers to a series of techniques aimed at reducing (mitigating) the errors that occur in quantum computing algorithms. Such techniques involve running additional mitigation circuits or modified target circuits (target circuit is the quantum circuit executed on the quantum computer creating the quantum results). As a result, the use of quantum error mitigation techniques generally results in longer execution times or requires access to additional qubits for increased accuracy. That is, such quantum error mitigation methods trade additional execution time for increased accuracy.

An example of a quantum error mitigation technique is probabilistic error cancellation where the noise of the target circuit is learned layer by layer and then cancelled in a probabilistic manner with an exponential overhead to control the subsequent spread in the variance of expectation values.

Another example of a quantum error mitigation technique that involves running additional mitigation circuits is zero noise extrapolation. Zero noise extrapolation is an error mitigation technique used to extrapolate the noiseless expectation value (probabilistic expected value of the quantum circuit with zero noise) of an observable from a range of expectation values computed at different noise levels. For example, the noiseless expectation value (also referred to as the "zero-noise" value) is extrapolated by fitting a function (referred to as an "extrapolation function") to the expectation values of the mitigation circuits measured at different noise levels, where the noise has been tuned by noise factors (indicates the "noisiness" of the quantum circuit, such as difference noise levels) achieved by inserting additional digital quantum gates.

Unfortunately, such techniques involve considerable overhead while increasing the execution time at runtime.

SUMMARY

In one embodiment of the present disclosure, a method for runtime quantum error mitigation comprises generating training data. The method further comprises training a machine learning model using the generated training data to perform quantum error mitigation. The method additionally comprises executing a quantum circuit on a quantum computer creating quantum results. Furthermore, the method comprises performing quantum error mitigation on the quantum results at runtime using the trained quantum machine learning model.

Additionally, in one embodiment of the present disclosure, the method further comprises generating noisy expectation values for the training data by sampling parameters of parameterized circuits with a fixed structure.

Furthermore, in one embodiment of the present disclosure, the parameterized circuits are ansatz circuits.

Additionally, in one embodiment of the present disclosure, the noisy expectation values of the training data are generated by sampling parameters of parameterized circuits using parameterized Hamiltonian time evolution.

Furthermore, in one embodiment of the present disclosure, the method additionally comprises implementing dynamic decoupling and/or twirling in a quantum circuit that generates the noisy expectation values.

Additionally, in one embodiment of the present disclosure, the method further comprises encoding features of the quantum circuit on a noisy quantum device.

Furthermore, in one embodiment of the present disclosure, the method additionally comprises generating target expectation values using the noisy expectation values and the encoded features, where the training data comprises the target expectation values generated using a noiseless simulator or an error mitigated quantum processing unit.

Additionally, in one embodiment of the present disclosure, the machine learning model is selected from the group consisting of a graph neural network model, a multilayer perceptron model, a random forest model, and an ordinary least squares model.

Furthermore, in one embodiment of the present disclosure, the method additionally comprises performing an optimization of the machine learning model using a loss function.

Other forms of the embodiments of the method described above are in a system and in a computer program product.

Accordingly, embodiments of the present disclosure train a machine learning model to perform quantum error mitigation on quantum results at runtime with less overhead and without increasing the execution time at runtime.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which:

FIG. 3 illustrates an example of hardware-efficient entangling ansatz in accordance with an embodiment of the present disclosure;

FIG. 4 illustrates the Trotterized spin dynamics in accordance with an embodiment of the present disclosure;

DETAILED DESCRIPTION

Figure 1:
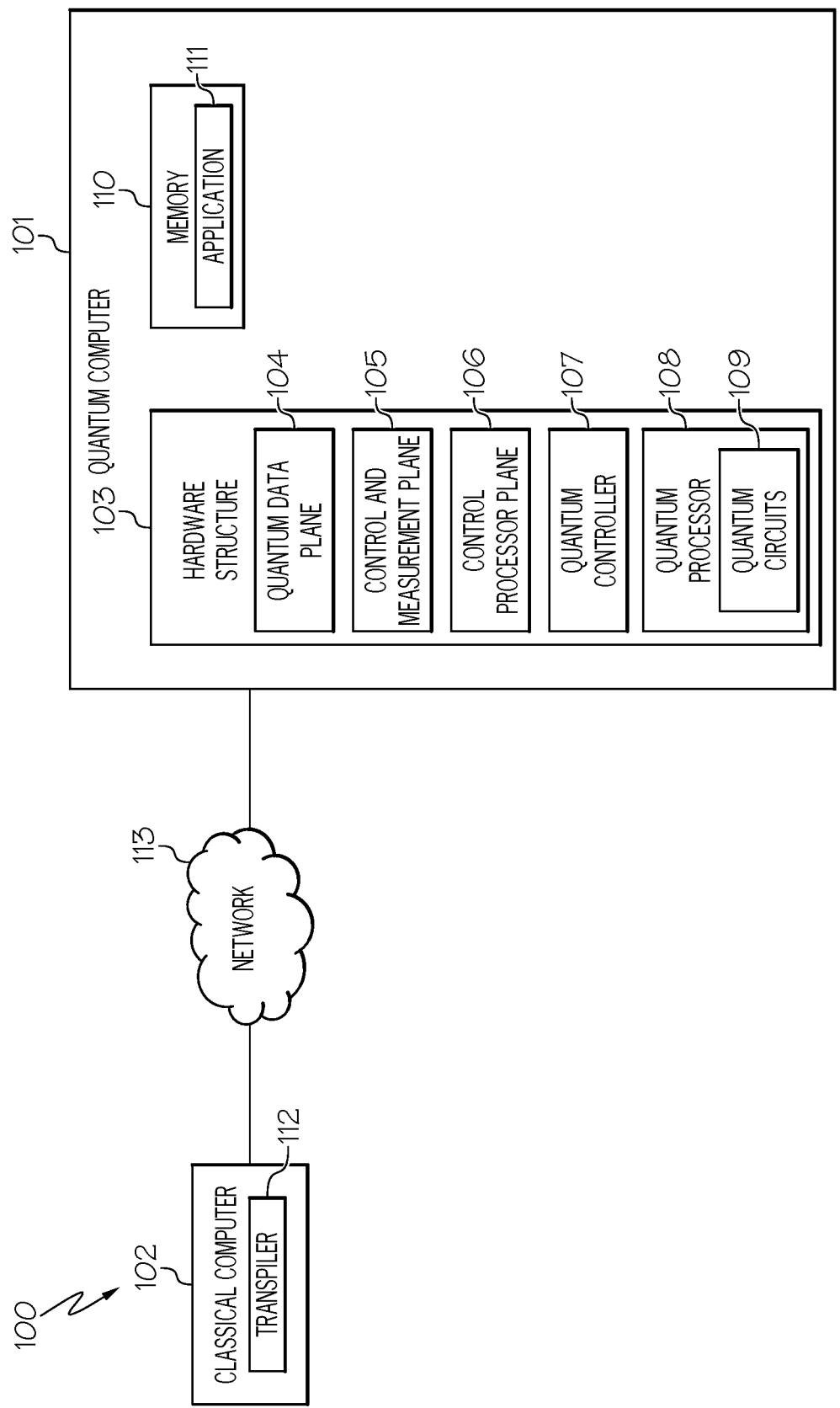
FIG. 1 illustrates a communication system for practicing the principles of the present disclosure in accordance with an embodiment of the present disclosure.

In one embodiment of the present disclosure, a method for runtime quantum error mitigation comprises generating training data. The method further comprises training a machine learning model using the generated training data to perform quantum error mitigation. The method additionally comprises executing a quantum circuit on a quantum computer creating quantum results. Furthermore, the method comprises performing quantum error mitigation on the quantum results at runtime using the trained quantum machine learning model.

In this manner, a machine learning model is trained to perform quantum error mitigation on quantum results at runtime with less overhead and without increasing the execution time at runtime.

Additionally, in one embodiment of the present disclosure, the method further comprises generating noisy expectation values for the training data by sampling parameters of parameterized circuits with a fixed structure.

In this manner, contextual and learnable training data is generated, which includes noisy expectation values for the training data.

Furthermore, in one embodiment of the present disclosure, the parameterized circuits are ansatz circuits.

In this manner, sampling of the parameters of the parameterized circuits can occur for ansatz circuits.

Additionally, in one embodiment of the present disclosure, the noisy expectation values of the training data are generated by sampling parameters of parameterized circuits using parameterized Hamiltonian time evolution.

In this manner, sampling of the parameters of the parameterized circuits is performed using parameterized Hamiltonian time evolution, such as Trotterized spin dynamics.

Furthermore, in one embodiment of the present disclosure, the method additionally comprises implementing dynamic decoupling and/or twirling in a quantum circuit that generates the noisy expectation values.

In this manner, the decoherence (coherent error) in noisy expectation values is suppressed, such as by implementing dynamic decoupling and/or twirling in a quantum circuit that generates the noisy expectation values, in order to make the device noise more easily learned.

Additionally, in one embodiment of the present disclosure, the method further comprises encoding features of the quantum circuit on a noisy quantum device.

In this manner, information about the noisy quantum device can be encoded.

Furthermore, in one embodiment of the present disclosure, the method additionally comprises generating target expectation values using the noisy expectation values and the encoded features, where the training data comprises the target expectation values generated using a noiseless simulator or an error mitigated quantum processing unit.

In this manner, accurate expectation values can be generated and used for training the machine learning model to perform quantum error mitigation on quantum results at runtime.

Additionally, in one embodiment of the present disclosure, the machine learning model is selected from the group consisting of a graph neural network model, a multilayer perceptron model, a random forest model, and an ordinary least squares model.

In this manner, an application-specific statistical model may be selected to be trained.

Furthermore, in one embodiment of the present disclosure, the method additionally comprises performing an optimization of the machine learning model using a loss function.

In this manner, the performance of the machine learning model is improved.

Other forms of the embodiments of the method described above are in a system and in a computer program product.

As stated above, current quantum hardware, however, is subject to different sources of noise, the most well-known being qubit decoherence, individual gate errors, and measurement errors. These errors limit the depth of the quantum circuit (i.e., the number of "layers" of quantum gates, executed in parallel, it takes to complete the computation defined by the quantum circuit) that can be implemented. However, even for shallow circuits, noise can lead to faulty estimates. Fortunately, quantum error mitigation provides a collection of tools and methods that allow one to evaluate accurate expectation values (probabilistic expected values of the quantum circuit) from noisy, shallow depth quantum circuits, even before the introduction of fault tolerance.

Quantum error mitigation refers to a series of techniques aimed at reducing (mitigating) the errors that occur in quantum computing algorithms. Such techniques involve running additional mitigation circuits or modified target circuits (target circuit is the quantum circuit executed on the quantum computer creating the quantum results). As a result, the use of quantum error mitigation techniques generally results in longer execution times or requires access to additional qubits for increased accuracy. That is, such quantum error mitigation methods trade additional execution time for increased accuracy.

An example of a quantum error mitigation technique is probabilistic error cancellation where the noise of the target circuit is learned layer by layer and then cancelled in a probabilistic manner with an exponential overhead to control the subsequent spread in the variance of expectation values.

Another example of a quantum error mitigation technique that involves running additional mitigation circuits is zero noise extrapolation. Zero noise extrapolation is an error mitigation technique used to extrapolate the noiseless expectation value (probabilistic expected value of the quantum circuit with zero noise) of an observable from a range of expectation values computed at different noise levels. For example, the noiseless expectation value (also referred to as the "zero-noise" value) is extrapolated by fitting a function (referred to as an "extrapolation function") to the expectation values of the mitigation circuits measured at different noise levels, where the noise has been tuned by noise factors (indicates the "noisiness" of the quantum circuit, such as difference noise levels) achieved by inserting additional digital quantum gates.

Unfortunately, such techniques involve considerable overhead while increasing the execution time at runtime.

The embodiments of the present disclosure provide the means for performing quantum error mitigation with less overhead without increasing the execution time at runtime. In one embodiment, a machine learning model is trained to perform quantum error mitigation to output mitigated expectation values from noisy expectation values. In one embodiment, the machine learning model is trained using noisy expectation values and corresponding target expectation values (noiseless expectation values). In one embodiment, noisy expectation values are generated by sampling parameters of parameterized circuits, such as quantum circuits that are structurally similar to the target quantum circuits (quantum circuits whose quantum results are to be subject to quantum error mitigation). In one embodiment, the decoherence (coherent error) in such noisy expectation values may be suppressed, such as by implementing dynamic decoupling and/or twirling in the quantum circuit that generates the noisy expectation values, in order to make the device noise more easily learned. Furthermore, in one embodiment, features of the quantum circuit (quantum circuit used in generating the noisy expectation values) on a noisy quantum device are encoded. In one embodiment, such features encoded using vectorization. In another embodiment, a graph representing the quantum circuit used in generating the noisy expectation values is generated. Information about the quantum circuit is then encoded as features using the graph. The target expectation values for the training data are then generated, such as by using a noiseless simulator or an error mitigated quantum processing unit, the noisy expectation values, and the encoded features. Such training data (includes both the noisy expectation values and the target expectation values) may then be used to train a machine learning model to perform quantum error mitigation based on learning the relationships between target and noisy expectation values. After training the machine learning model to perform quantum error mitigation, the machine learning model may then be used to perform quantum error mitigation (output mitigated expectation values from noisy expectation values) on quantum results, which includes noisy expectation values, created by executing a quantum circuit on a quantum computer at runtime. By performing quantum error mitigation in such a manner, there are significant savings in quantum execution time while improving the accuracy of the results in performing quantum error mitigation on quantum results at runtime without additional mitigation circuits. These and other features will be discussed in further detail below.

In some embodiments of the present disclosure, the present disclosure comprises a method, system, and computer program product for runtime quantum error mitigation. In one embodiment of the present disclosure, training data, which includes noisy expectation values and target expectation values (noiseless expectation values), is generated. A machine learning model is then trained using the training data to perform quantum error mitigation based on learning the relationships between target and noisy expectation values. That is, such a machine learning model is trained to generate target expectation values based on inputted noisy expectation values. In one embodiment, such machine learning models can include, but are not limited to, a graph neural network model, a multilayer perceptron model, a random forest model, an ordinary least squares model, etc. Upon executing a quantum circuit on a quantum computer creating quantum results, quantum error mitigation is performed on the quantum results at runtime using the trained machine learning model. In this manner, there are significant savings in quantum execution time while improving the accuracy of the results in performing quantum error mitigation on quantum results at runtime without additional mitigation circuits.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a communication system 100 for practicing the principles of the present disclosure. Communication system 100 includes a quantum computer 101 configured to perform quantum computations, such as the types of computations that harness the collective properties of quantum states, such as superposition, interference, and entanglement, as well as a classical computer 102 in which information is stored in bits that are represented logically by either a 0 (off) or a 1 (on). Examples of classical computer 102 include, but not limited to, a portable computing unit, a Personal Digital Assistant (PDA), a laptop computer, a mobile device, a tablet personal computer, a smartphone, a mobile phone, a navigation device, a gaming unit, a desktop computer system, a workstation, and the like configured with the capability of connecting to network 113 (discussed below).

In one embodiment, classical computer 102 is used to set up the state of quantum bits in quantum computer 101 and then quantum computer 101 starts the quantum process. Furthermore, in one embodiment, classical computer 102 is configured to train a machine learning model to perform quantum error mitigation on quantum results at runtime with less overhead and without increasing the execution time at runtime as discussed further below.

In one embodiment, a hardware structure 103 of quantum computer 101 includes a quantum data plane 104, a control and measurement plane 105, a control processor plane 106, a quantum controller 107, and a quantum processor 108. While depicted as being located on a single machine, quantum data plane 104, control and measurement plane 105, and control processor plane 106 may be distributed across multiple computing machines, such as in a cloud computing architecture, and communicate with quantum controller 107, which may be located in close proximity to quantum processor 108.

Quantum data plane 104 includes the physical qubits or quantum bits (basic unit of quantum information in which a qubit is a two-state (or two-level) quantum-mechanical system) and the structures needed to hold them in place. In one embodiment, quantum data plane 104 contains any support circuitry needed to measure the qubits' state and perform gate operations on the physical qubits for a gate-based system or control the Hamiltonian for an analog computer. In one embodiment, control signals routed to the selected qubit(s) set a state of the Hamiltonian. For gate-based systems, since some qubit operations require two qubits, quantum data plane 104 provides a programmable "wiring" network that enables two or more qubits to interact.

Control and measurement plane 105 converts the digital signals of quantum controller 107, which indicates what quantum operations are to be performed, to the analog control signals needed to perform the operations on the qubits in quantum data plane 104. In one embodiment, control and measurement plane 105 converts the analog output of the measurements of qubits in quantum data plane 104 to classical binary data that quantum controller 107 can handle.

Control processor plane 106 identifies and triggers the sequence of quantum gate operations and measurements (which are subsequently carried out by control and measurement plane 105 on quantum data plane 104). These sequences execute the program, provided by quantum processor 108, for implementing a quantum algorithm.

In one embodiment, control processor plane 106 runs the quantum error correction algorithm (if quantum computer 101 is error corrected).

In one embodiment, quantum processor 108 uses qubits to perform computational tasks. In the particular realms where quantum mechanics operate, particles of matter can exist in multiple states, such as an "on" state, an "off" state, and both "on" and "off" states simultaneously. Quantum processor 108 harnesses these quantum states of matter to output signals that are usable in data computing.

In one embodiment, quantum processor 108 performs algorithms which conventional processors are incapable of performing efficiently.

In one embodiment, quantum processor 108 includes one or more quantum circuits 109. Quantum circuits 109 may collectively or individually be referred to as quantum circuits 109 or quantum circuit 109, respectively. A "quantum circuit 109," as used herein, refers to a model for quantum computation in which a computation is a sequence of quantum logic gates, measurements, initializations of qubits to known values and possibly other actions. A "quantum logic gate," as used herein, is a reversible unitary transformation on at least one qubit. Quantum logic gates, in contrast to classical logic gates, are all reversible. Examples of quantum logic gates include RX (performs $e^{i\theta X/2}$, which corresponds to a rotation of the qubit state around the X-axis by the given angle theta θ on the Bloch sphere), RY (performs $e^{i\theta Y/2}$, which corresponds to a rotation of the qubit state around the Y-axis by the given angle theta θ on the Bloch sphere), RXX (performs the operation $e^{(-i\theta X \otimes X/2)}$ on the input qubit), RZZ (takes in one input, an angle theta θ expressed in radians, and it acts on two qubits), etc. In one embodiment, quantum circuits 109 are written such that the horizontal axis is time, starting at the left-hand side and ending at the right-hand side.

Furthermore, in one embodiment, quantum circuit 109 corresponds to a command structure provided to control processor plane 106 on how to operate control and measurement plane 105 to run the algorithm on quantum data plane 104/quantum processor 108.

Furthermore, quantum computer 101 includes memory 110, which may correspond to quantum memory. In one embodiment, memory 110 is a set of quantum bits that store quantum states for later retrieval. The state stored in quantum memory 110 can retain quantum superposition.

In one embodiment, memory 110 stores an application 111 that may be configured to implement one or more of the methods described herein in accordance with one or more embodiments. For example, application 111 may implement a program for training a machine learning model to perform quantum error mitigation on quantum results at runtime with less overhead and without increasing the execution time at runtime as discussed further below in connection with FIGS. 2-5 and 7-8. Examples of memory 110 include light quantum memory, solid quantum memory, gradient echo memory, electromagnetically induced transparency, etc.

Furthermore, in one embodiment, classical computer 102 includes a "transpiler 112," which as used herein, is configured to rewrite an abstract quantum circuit 109 into a functionally equivalent one that matches the constraints and characteristics of a specific target quantum device. In one embodiment, transpiler 112 (e.g., qiskit.transpiler, where Qiskit® is an open-source software development kit for working with quantum computers at the level of circuits, pulses, and algorithms) converts the trained machine learning model upon execution on quantum hardware 103 to its elementary instructions and maps it to physical qubits.

In one embodiment, quantum machine learning models are based on variational quantum circuits 109. Such models consist of data encoding, processing parameterized with trainable parameters, and measurement/post-processing.

In one embodiment, the number of qubits (basic unit of quantum information in which a qubit is a two-state (or two-level) quantum-mechanical system) is determined by the number of features in the data. This processing stage may include multiple layers of parameterized gates. As a result, in one embodiment, the number of trainable parameters is (number of features)*(number of layers).

Furthermore, as shown in FIG. 1, classical computer 102, which is used to set up the state of quantum bits in quantum computer 101, may be connected to quantum computer 101 via a network 113.

Network 113 may be, for example, a quantum network, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, a cellular network and various combinations thereof, etc. Other networks, whose descriptions are omitted here for brevity, may also be used in conjunction with system 100 of FIG. 1 without departing from the scope of the present disclosure.

Furthermore, classical computer 102 is configured to train a machine learning model to perform quantum error mitigation on quantum results at runtime with less overhead and without increasing the execution time at runtime as discussed further below in connection with FIGS. 2-5 and 7-8. A description of the software components of classical computer 102 is provided below in connection with FIG. 2 and a description of the hardware configuration of classical computer 102 is provided further below in connection with FIG. 6.

System 100 is not to be limited in scope to any one particular network architecture. System 100 may include any number of quantum computers 101, classical computers 102, and networks 113.

A discussion regarding the software components used by classical computer 102 for training a machine learning model to perform quantum error mitigation on quantum results at runtime with less overhead and without increasing the execution time at runtime is provided below in connection with FIG. 2.

Figure 2:
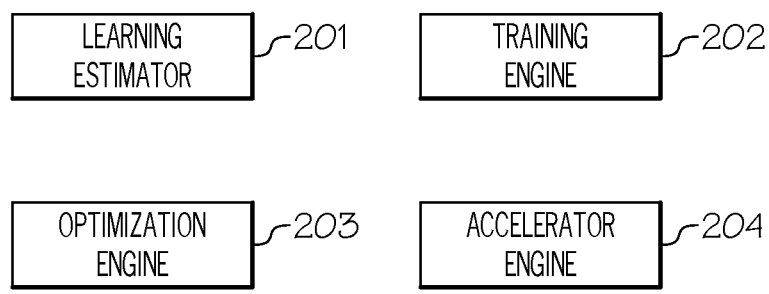
FIG. 2 is a diagram of the software components of the classical system for training a machine learning model to perform quantum error mitigation on quantum results at runtime with less overhead and without increasing the execution time at runtime in accordance with an embodiment of the present disclosure.

FIG. 2 is a diagram of the software components of classical system 102 (FIG. 1) for training a machine learning model to perform quantum error mitigation on quantum results at runtime with less overhead and without increasing the execution time at runtime in accordance with an embodiment of the present disclosure.

Referring to FIG. 2, in conjunction with FIG. 1, classical computer 102 includes a learning estimator 201 configured to generate noisy expectation values for the training data to train the machine learning model to perform quantum error mitigation on quantum results at runtime. In one embodiment, learning estimator 201 generates such noisy expectation values by sampling parameters of parameterized quantum circuits with a fixed structure. In one embodiment, such parameterized quantum circuits correspond to quantum circuits that are structurally similar to the target quantum circuit. A target quantum circuit, as used herein, refers to the quantum circuit whose quantum results are to be subject to quantum error mitigation.

In one embodiment, learning estimator 201 generates noisy expectation values by sampling parameters of parameterized quantum circuits with a fixed structure using various software tools, which may include, but are not limited to, Cirq®, Qulacs®, QuCAT, Qiskit®, etc.

In one embodiment, such parameterized circuits are ansatz circuits. An ansatz circuit, as used herein, refers to a circuit with a predetermined circuit geometry and parametrized gates expressing a time-evolution unitary operator. In one embodiment, training such a circuit involves learning the gate parameters through a gradient-descent algorithm where the gradients themselves can be efficiently estimated by the quantum circuit.

For example, using an ansatz circuit, hardware-efficient entangling ansatz may be performed to sample the parameters of parameterized circuits as illustrated in FIG. 3.

FIG. 3 illustrates an example of hardware-efficient entangling ansatz 300 in accordance with an embodiment of the present disclosure.

As shown in FIG. 3, hardware-efficient entangling ansatz 300 consists of a sequence of single qubit rotation gates 301 and "entangling" 2-qubit gates 302A-302D. Entangling 2-qubit gates 302A-302D may collectively or individually be referred to as entangling 2-qubit gates 302 or entangling 2-qubit gate 302, respectively. As further illustrated in FIG. 3, each qubit gate 301 has an angle, θ, as a parameter. It is noted that FIG. 3 is not to be limited in scope to the depicted number of single qubit rotation gates 301 and "entangling" 2-qubit gates 302.

Returning to FIG. 2, in conjunction with FIGS. 1 and 3, in one embodiment, the noisy expectation values of the training data are generated by sampling parameters of parameterized circuits using Hamiltonian time evolution, such as Trotterized spin dynamics. In one embodiment, Hamiltonians are hermitian operators that are a sum of a large number of individual Hamiltonians $H_j$. For example, a Hamiltonian H can be equal to $H_1+H_2$. This sum of 2 Hamiltonians can be described by the Lie product formula: $e^{-i(H_1+H_2)t} = \lim N \to \infty (e^{-iH_1 t/N} e^{-iH_2 t/N})^N$. Since the limit of this formula is infinite, the series is truncated when implementing this formula on a quantum computer. The truncation introduces error in the simulation that can be bounded by a maximum simulation error $\epsilon$ such that $\|e^{-iHt} - U\| \leq \epsilon$. This truncation is known as Trotterization. The Trotterization formula is then $e^{-iHt} = (e^{-iH_0 t/r} * e^{-iH_1 t/r} \cdots *e^{-iH_{d-1} t/r})^r + 0$ (some polynomial factors). Hence, Trotterization can be exploited to mitigate the Trotter error (error in Trotterization) in digital quantum simulation. In one embodiment, Trotterization is exploited to mitigate the Trotter error in digital quantum simulation via spin dynamics (Trotterized spin dynamics), such as spin dynamics of the transverse-field Ising model as illustrated in FIG. 4.

FIG. 4 illustrates the Trotterized spin dynamics in accordance with an embodiment of the present disclosure. As shown in FIG. 4, FIG. 4 illustrates a quantum circuit 400 for a 6-spin chain of the single Trotter step. A simulation via a product formula proceeds by dividing the total evolution time into a finite number of steps and performing an approximate simulation of exp(–iHt/r)r times. Each simulation of exp(–iHt/r) is called a Trotter step.

Furthermore, in one embodiment, learning estimator 201 is configured to make such noise (noisy expectation values) more easily learned, such as by implementing dynamic decoupling and/or twirling in the quantum circuit that generates the noisy expectation values. By performing such dynamic decoupling and/or twirling, the effect of the coherent error is reduced. The result of such a procedure is to make the noise model easier to learn by the machine learning model thereby requiring fewer training circuits and enabling generalization of mitigation capabilities from the training set to the more general classes of circuits.

Dynamic decoupling, as used herein, is an open-loop quantum control technique to exploit fast time-dependent controlled modulation to suppress decoherence. In one embodiment, dynamic decoupling is implemented by a periodic sequence of instantaneous control pulses, the net effect of which is to nearly average to zero undesired system-environment coupling. In one embodiment, learning estimator 201 utilizes various schemes (e.g., Carr-Purcell, Carr-Purcell-Meiboom-Gill) for designing dynamic decoupling protocols with realistic marginal intensity controlled pulses, achieving high-order error suppression, and achieving compatibility between dynamic decoupling and quantum gates thereby extending the coherence time of the qubits.

Twirling, as used herein, is a technique used for converting arbitrary noise channels into Pauli channels in error threshold estimations of quantum error correction codes. That is, twirling is a technique that "twirls" out the irregularity of an arbitrary error channel, turning it into a Pauli error channel.

In one embodiment, learning estimator 201 uses various software tools for implementing dynamic decoupling and/or twirling in the quantum circuit that generates the noisy expectation values which can include, but are not limited to, ADAPT, VAQEM, Qiskit®, etc.

In one embodiment, learning estimator 201 is configured to encode information about the quantum circuit on the noisy quantum device. In one embodiment, features of the quantum circuit (quantum circuit used in generating the noisy expectation values) on a noisy quantum device are encoded using vectorization (converting features of the quantum circuit into vectors). For example, features of the quantum circuit (quantum circuit used in generating the noisy expectation values) on a noisy quantum device are encoded using vectorization, such as Word2vec, Doc2Vec, GloVe, etc.

Alternatively, such features of the quantum circuit (quantum circuit used in generating the noisy expectation values) on a noisy quantum device are encoded using a graph. In one embodiment, a graph representing the quantum circuit used in generating the noisy expectation values is generated. Information about the quantum circuit is then encoded as features using the graph. As a result, learning estimator 201 generates a graph representing the quantum circuit used in generating the noisy expectation values, such as shown in Figure S.

Figure 5:
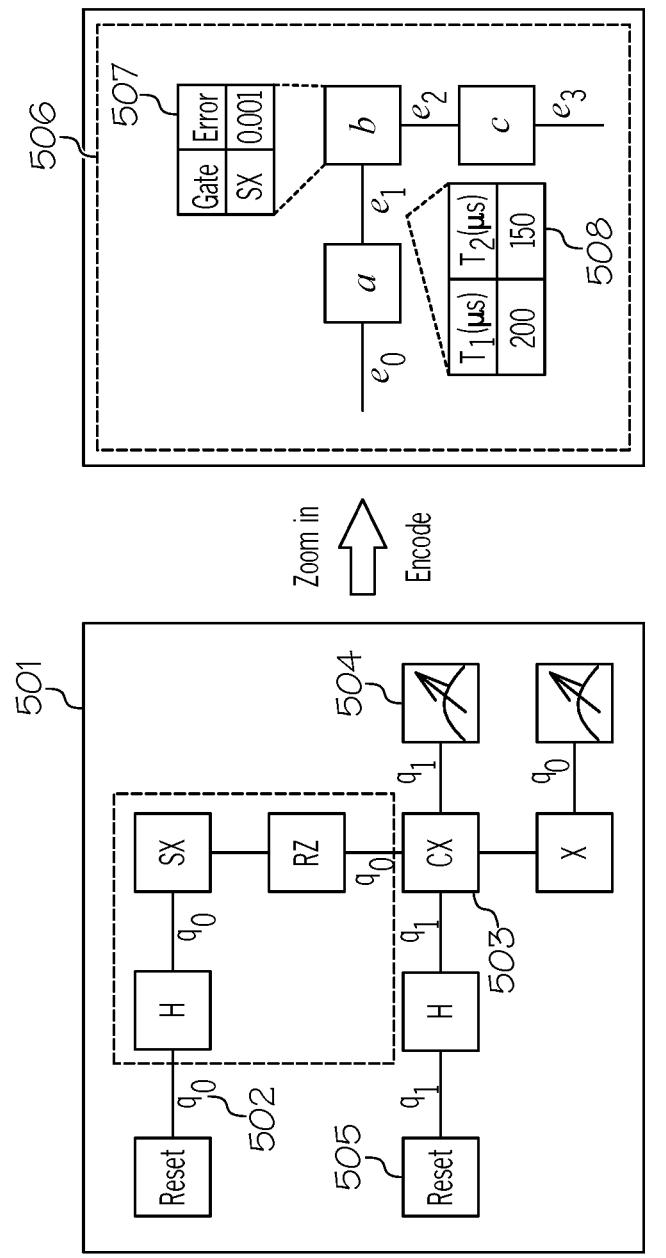
FIG. 5 illustrates a graph of the quantum circuit used in generating the noisy expectation values as well as a graph of the encoded features of the quantum circuit in accordance with an embodiment of the present disclosure.

FIG. 5 illustrates a graph 501 of the quantum circuit used in generating the noisy expectation values as well as a graph 506 of the encoded features of the quantum circuit in accordance with an embodiment of the present disclosure.

As shown in FIG. 5, graph 501 of the quantum circuit used in generating the noisy expectation values is represented by various qubits 502 (e.g., $q_0$, $q_1$), quantum gates 503 (e.g., SX, RZ, CX, X, H), measurement gates 504, and resets 505 (reset the quantum bit to its default state). In one embodiment, such elements or components (e.g., quantum gates 503) of graph 501 of the quantum circuit used in generating the noisy expectation values are obtained by converting the circuit to a DAG (directed acyclic graph) using the DAGCircuit function of Qiskit®.

In one embodiment, learning estimator 201 generates such a graph 501 of the quantum circuit used in generating the noisy expectation values using various software tools, which can include, but are not limited to, Azure®, QCVis, Cirq®, etc.

Features of the quantum circuit, such as the quantum circuit of graph 501, may then be encoded on a noisy quantum device (see graph 506 of the encoded features of FIG. 5) using graph 501 of FIG. 5. Encoding, as used herein, refers to converting the features of the elements (e.g., quantum gates 503) of graph 501 of the quantum circuit (quantum circuit used in generating the noisy expectation values) into a form that is usable for generating the target expectation values (probabilistic expected values of the target quantum circuit) For example, such features that are encoded include the error associated with a quantum gate (e.g. SX), such as the quantum gate error (e.g., 0.001) as illustrated by element 507 of FIG. 5, which describes the scenario in which the actually induced transformation deviates from $|\psi\rangle \mapsto U|\psi\rangle$. Gate errors may result from miscalibration or imperfections in the control hardware and their interactions with the qubits. In another example, such features that are encoded include the operation times of the quantum gates, such as in μs, as illustrated by element 508 of FIG. 5.

In one embodiment, such features are learned and encoded based on simulations performed on the quantum circuit displayed in graph 501.

In one embodiment, learning estimator 201 encodes such features of the quantum circuit on the noisy quantum device by performing simulations of the quantum circuit displayed in graph 501 using various software tools, which can include, but are not limited to, Qiskit®, TensorFlow®, Cirq®, Azure®, etc.

In one embodiment, such features are learned and encoded based on iterating over the nodes in the DAG (directed acyclic graph), such as by using the dag.topological_op_nodes( ) function in Qiskit®. The objects returned are DAGNodes and contain the feature information to be encoded by learning estimator 201.

Furthermore, in one embodiment, learning estimator 201 generates target expectation values for the training data using the encoded features of the quantum circuit and the noisy expectation values. Target expectation values, as used herein, refer to the probabilistic expected values of the target quantum circuit.

In one embodiment, learning estimator 201 generates such target expectation values using a noiseless simulator That is, such target expectation values are generated by simulators that mimic the behavior of a perfect (noiseless) quantum computer using the encoded features of the quantum circuit and the noisy expectation values. Examples of such noiseless simulators can include, but are not limited to, Intel® Quantum Simulator, Qrack®, staq, qsimcirq package in Cirq®, QuEST®, etc.

In one embodiment, learning estimator 201 generates such target expectation values using an error mitigated quantum processing unit using the encoded features of the quantum circuit and the noisy expectation values. Examples of such quantum processing units that are error mitigated, such as via probabilistic error cancellation and zero noise extrapolation, can include, but are not limited to, Rigetti® 19Q, Google® Bristlecone, Intel® Tangle Lake, IBM Q®, Google® Sycamore, IBM® Eagle, IBM® Osprey, etc.

Classical computer 102 further includes a training engine 202 configured to train a machine learning model using the training data, which includes the target expectation values and the noisy expectation values, to generate target expectation values based on inputted noisy expectation values. That is, such a machine learning model is trained to perform quantum error mitigation based on learning the relationships between target and noisy expectation values. In one embodiment, such machine learning models can include, but are not limited to, a graph neural network model, a multilayer perceptron model, a random forest model, an ordinary least squares model, etc.

In one embodiment, the graph neural network model utilizes graph-structured input data with the node and edge features encoding quantum circuit and noise information. In one embodiment, the model consists of multiple layers of message-passing operations, capturing both local and global information within the graph and enabling intricate relationships to be modeled.

In one embodiment, the graph neural network model is utilized for encoding data (e.g., quantum circuits, device noise parameters) into graph structures. In one embodiment, to accomplish data encoding, each quantum circuit is first transpiled into hardware-native gates that adhere to the quantum device's connectivity, and subsequently converted into a directed acyclic graph (DAG). In the graph, each edge signifies a qubit that receives instructions when directed towards a node, while each node corresponds to a gate. These nodes are assigned vectors containing information about the gate type, gate errors as well as the coherence times and readout errors of the qubits on which the gate operates. Additional device and qubit characterizations, such as qubit crosstalk and idling period duration, can be encoded on the edge or node. In one embodiment, the DAG of a quantum circuit, embedded with device and qubit characterizations, is converted into a non-directed acyclic graph and serves as input to the transformer convolution layers of the graph neural network. These message-passing layers iteratively process and aggregate encoded vectors on neighboring nodes and connected 9 edges to update the assigned vector on each node. This enables the exchange of information based on graph connectivity facilitating the extraction of useful information from the nodes which may correspond to the gate sequence. The output, along with the noisy expectation values, is passed through dense layers to generate a graph level prediction, specifically the mitigated expectation values. As a result, after training the layers using backpropagation to minimize the mean squared error between the noisy and ideal expectation values, the graph neural network model learns to perform quantum error mitigation.

In one embodiment, with respect to the multi-layer perceptron model, the model consists of one or more fully-connected layers of neurons. Furthermore, in one embodiment, the model utilizes the same encoding as used for linear regression. Additionally, in one embodiment, the non-linear activation functions enable the approximation of non-linear relationships.

In one embodiment, with respect to the multi-layer perceptron model, nodes within the hidden layers utilize non-linear activation functions, such as the rectified linear unit (ReLU), enabling the multi-layer perceptron model to model non-linear relationships. In one embodiment, the multi-layer perceptron model is constructed with 2 dense layers, a hidden size of 128, the ReLU activation function, and input features identical to those employed in the random forest model (discussed further below).

In one embodiment, to train the multi-layer perceptron model, the mean squared error is minimized between the predicted and true ideal expectation values employing backpropagation to update the neurons. In one embodiment, the batch size is 32, and the optimizer used has an initial learning rate of 0.001. In one embodiment, regularization techniques, such as dropout or weight decay, are used to prevent overfitting.

In one embodiment, the random forest model consists of an ensemble of decision trees and produces a prediction by averaging the predictions from each tree.

In one embodiment, the random forest model, as an ensemble learning method, employs bootstrap aggregating to combine the results produced from many decision trees, which enhances prediction accuracy and mitigates overfitting. Moreover, each decision tree within the random forest utilizes a random subset of features to minimize correlation between trees, further improving prediction accuracy. In one embodiment, the input features to the random forest model are extracted from the quantum circuits and device-specific noise parameters, such as gate counts (parameterized gates are counted in binned angles), gate error rates, and qubit coherence times. In one embodiment, a random forest regressor is trained with a specified large number of decision trees on the training data. Given all the features, the random forest model averages the predictions from all its decision trees to produce an estimate of the ideal expectation value. In one embodiment, 300 tree estimators are used for each observable. In one embodiment, the tree construction process follows a top-down, recursive, and greedy approach, using the Classification and Regression Trees (CART) algorithm. For the splitting criterion, the mean squared error reduction is employed for regressions. Furthermore, in one embodiment, for each tree, at least 2 samples are used to split an internal node, and 1 feature is considered when looking for the best split.

In one embodiment, with respect to linear regression methods, such as the ordinary least squares model, the input features may correspond to vectors, including circuit features, such as the number of two-qubit gates and SX gates, noisy expectation values, and observables. In one embodiment, the ordinary least squares model consists of a linear function that maps input features to mitigated values.

In one embodiment, such a linear regression model, such as the ordinary least squares model, where the relationship between a dependent variable (the ideal expectation value) and one or more independent variables (the features extracted from quantum circuits) is modeled using a linear function.

In one embodiment, the ordinary least squares model extends the feature set to include gate counts where parameterized gates are binned by their parameter. Secondly, the ordinary least squares model does not necessarily require training on Clifford versions of the target circuits, although this option remains available if desired. Instead, the linear regression model is trained which takes these features as input and predicts the ideal expectation values. The model minimizes the sum squared error between the mitigated and the ideal expectation values using a closed-form solution, which is named ordinary least squares (OLS). The linear regression model can also be trained using other methods, such as ridge regression, least absolute shrinkage and selection operator (LASSO), or elastic net. These methods differ in their regularization techniques, which can help prevent overfitting and improve model generalization.

Furthermore, in one embodiment, training engine 202 builds and trains a machine learning model to perform quantum error mitigation on quantum results at runtime.

In one embodiment, the model is trained to perform quantum error mitigation on quantum results at runtime based on a sample data set that includes the target expectation values and the noisy expectation values. Such a sample data set may be stored in a data structure (e.g., table) residing within the storage device of classical computer 102. In one embodiment, such a data structure is populated with the training data discussed above.

Furthermore, in one embodiment, the sample data set discussed above is used by a machine learning algorithm to make predictions or decisions as to the quantum error mitigation to be performed on quantum results at runtime. The algorithm iteratively makes predictions on the sample data set as to the quantum error mitigation to be performed on quantum results at runtime until the predictions achieve the desired accuracy as determined by an expert. Examples of such learning algorithms include nearest neighbor, Naïve Bayes, decision trees, linear regression, support vector machines, and neural networks.

Additionally, classical computer 102 includes an optimization engine 203 configured to perform an optimization of the machine learning model, such as by using a loss function, to improve the performance of the machine learning model A loss function measures the difference between the predicted output of a model and the actual output, such as for each training sample. Optimization engine 203 is then configured to adjust the model's parameters to minimize the loss function. Examples of such loss functions can include, but are not limited to, mean squared error (calculates the average squared difference between the predicted output and the actual output), mean absolute error (measures the average absolute difference between the predicted and true values), cross-entropy (measures the dissimilarity between the predicted probability distribution and the actual probability distribution), etc. Examples of such optimizers used by optimization engine 203 to perform such optimization (adjust the model's parameters to minimize the loss function) can include, but are not limited to, gradient descent (adjusts the model's parameters by taking the derivative of the loss function with respect to the parameters and updating the parameters in the direction of the negative gradient), stochastic gradient descent (updates the model's parameters after each training sample, rather than after each epoch), adaptive moment estimation (uses the first and second moments of the gradients to adjust the learning rate adaptively), etc.

In one embodiment, the machine learning model is trained by optimization engine 203 by minimizing a loss function capturing the difference between the predicted mitigated and ideal expectation values computed with a noiseless simulator.

Additionally, classical computer 102 includes an accelerator engine 204 configured to execute a quantum circuit on a quantum computer, such as quantum computer 101, creating quantum results.

Furthermore, accelerator engine 204 is configured to perform quantum error mitigation on the quantum results, which include noisy expectation values, at runtime using the trained machine learning model. For example, based on the quantum results which include noisy expectation values, the trained machine learning model is configured to output mitigated expectation values. Accelerator engine 204 may perform such quantum error mitigation on the quantum results at runtime involving various applications, such as quantum tomography, which characterizes the complete quantum state of a particle or particles through a series of measurements in different bases, and the variational quantum eigensolver, which is a quantum algorithm for quantum chemistry, quantum simulations, and optimization problems.

By performing quantum error mitigation in such a manner, there are significant savings in quantum execution time while improving the accuracy of the results without additional mitigation circuits at runtime. Furthermore, the approach of the present disclosure offers a path to scalability, is noise-model agnostic, and is able to accommodate application-specific requirements of accuracy and generalizability. Additionally, using the approach of the present disclosure, a user may execute fewer quantum circuits and still obtain accurate, error-mitigated expectation values using pre-loaded machine learning models, or, alternatively, such users can train their own machine learning models.

A further description of these and other functions is provided below in connection with the discussion of the method for training a machine learning model to perform quantum error mitigation on quantum results at runtime with less overhead and without increasing the execution time at runtime.

Prior to the discussion of the method for training a machine learning model to perform quantum error mitigation on quantum results at runtime with less overhead and without increasing the execution time at runtime, a description of the hardware configuration of classical computer 102 (FIG. 1) is provided below in connection with FIG. 6.

Figure 6:
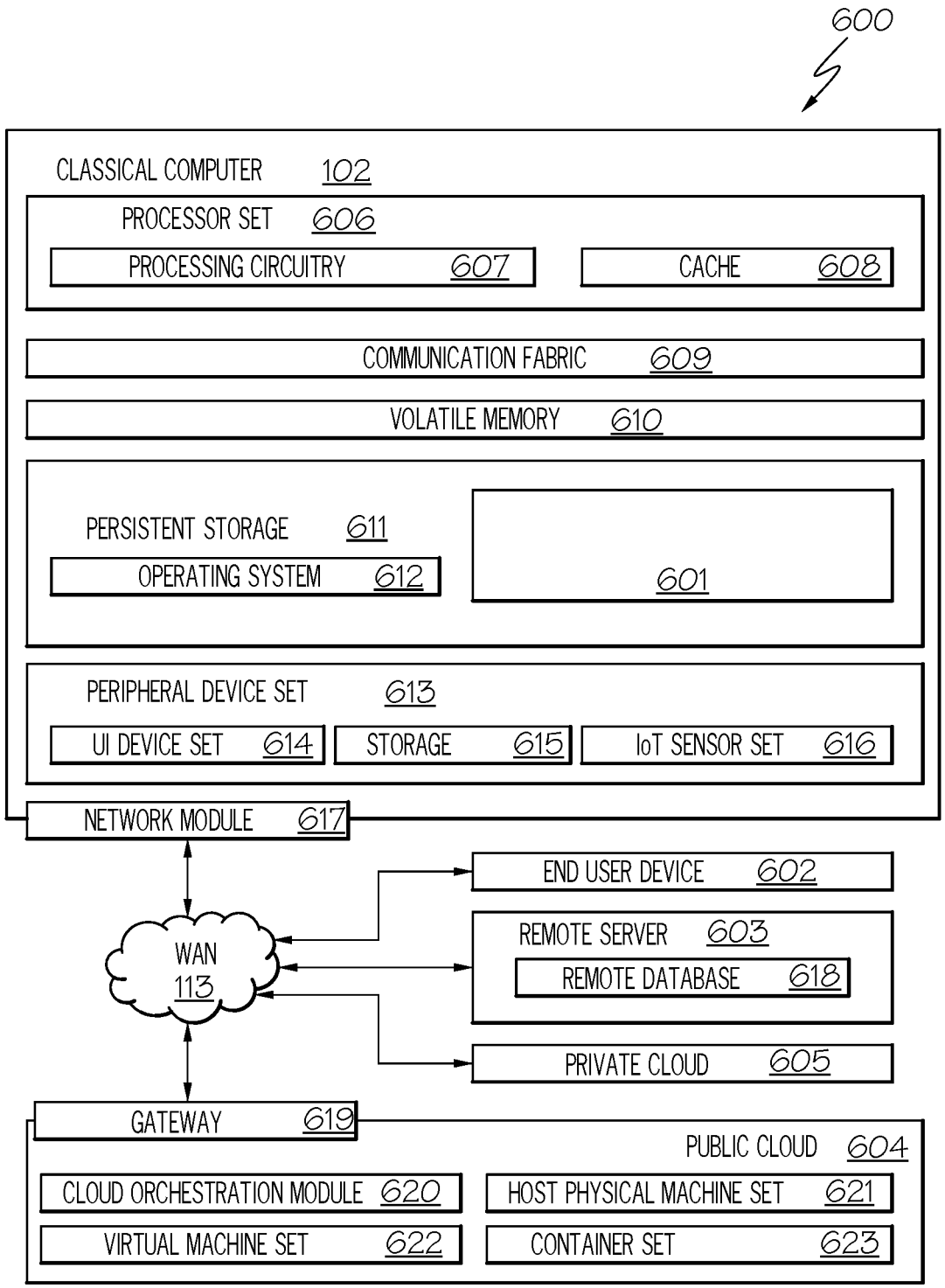
FIG. 6 illustrates an embodiment of the present disclosure of the hardware configuration of the classical computer which is representative of a hardware environment for practicing the present disclosure.

Referring now to FIG. 6, in conjunction with FIG. 1, FIG. 6 illustrates an embodiment of the present disclosure of the hardware configuration of classical computer 102 which is representative of a hardware environment for practicing the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 600 contains an example of an environment for the execution of at least some of the computer code 601 involved in performing the inventive methods, such as training a machine learning model to perform quantum error mitigation on quantum results at runtime with less overhead and without increasing the execution time at runtime. In addition to block 601, computing environment 600 includes, for example, classical computer 102, network 113, such as a wide area network (WAN), end user device (EUD) 602, remote server 603, public cloud 604, and private cloud 605. In this embodiment, classical computer 102 includes processor set 606 (including processing circuitry 607 and cache 608), communication fabric 609, volatile memory 610, persistent storage 611 (including operating system 612 and block 601, as identified above), peripheral device set 613 (including user interface (UI) device set 614, storage 615, and Internet of Things (IoT) sensor set 616), and network module 617. Remote server 603 includes remote database 618. Public cloud 604 includes gateway 619, cloud orchestration module 620, host physical machine set 621, virtual machine set 622, and container set 623.

Classical computer 102 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 618. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically classical computer 102, to keep the presentation as simple as possible. Classical computer 102 may be located in a cloud, even though it is not shown in a cloud in FIG. 6. On the other hand, classical computer 102 is not required to be in a cloud except to any extent as may be affirmatively indicated.

Processor set 606 includes one, or more, computer processors of any type now known or to be developed in the future. Processing circuitry 607 may be distributed over multiple packages, for example, multiple, coordinated integrated circuit chips. Processing circuitry 607 may implement multiple processor threads and/or multiple processor cores. Cache 608 is memory that is located in the processor chip package(s) and is typically used for data or code that should be available for rapid access by the threads or cores running on processor set 606. Cache memories are typically organized into multiple levels depending upon relative proximity to the processing circuitry. Alternatively, some, or all, of the cache for the processor set may be located "off chip." In some computing environments, processor set 606 may be designed for working with qubits and performing quantum computing.

Computer readable program instructions are typically loaded onto classical computer 102 to cause a series of operational steps to be performed by processor set 606 of classical computer 102 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 608 and the other storage media discussed below. The program instructions, and associated data, are accessed by processor set 606 to control and direct performance of the inventive methods. In computing environment 600, at least some of the instructions for performing the inventive methods may be stored in block 601 in persistent storage 611.

Communication fabric 609 is the signal conduction paths that allow the various components of classical computer 102 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 610 is any type of volatile memory now known or to be developed in the future. Examples include dynamic type random access memory (RAM) or static type RAM. Typically, the volatile memory is characterized by random access, but this is not required unless affirmatively indicated. In classical computer 102, the volatile memory 610 is located in a single package and is internal to classical computer 102, but, alternatively or additionally, the volatile memory may be distributed over multiple packages and/or located externally with respect to classical computer 102.

Persistent Storage 611 is any form of non-volatile storage for computers that is now known or to be developed in the future. The non-volatility of this storage means that the stored data is maintained regardless of whether power is being supplied to classical computer 102 and/or directly to persistent storage 611. Persistent storage 611 may be a read only memory (ROM), but typically at least a portion of the persistent storage allows writing of data, deletion of data and re-writing of data. Some familiar forms of persistent storage include magnetic disks and solid state storage devices. Operating system 612 may take several forms, such as various known proprietary operating systems or open source Portable Operating System Interface type operating systems that employ a kernel. The code included in block 601 typically includes at least some of the computer code involved in performing the inventive methods.

Peripheral device set 613 includes the set of peripheral devices of classical computer 102. Data communication connections between the peripheral devices and the other components of classical computer 102 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 614 may include components such as a display screen, speaker, microphone, wearable devices (such as goggles and smart watches), keyboard, mouse, printer, touchpad, game controllers, and haptic devices. Storage 615 is external storage, such as an external hard drive, or insertable storage, such as an SD card. Storage 615 may be persistent and/or volatile. In some embodiments, storage 615 may take the form of a quantum computing storage device for storing data in the form of qubits. In embodiments where classical computer 102 is required to have a large amount of storage (for example, where classical computer 102 locally stores and manages a large database) then this storage may be provided by peripheral storage devices designed for storing very large amounts of data, such as a storage area network (SAN) that is shared by multiple, geographically distributed computers. IoT sensor set 616 is made up of sensors that can be used in Internet of Things applications. For example, one sensor may be a thermometer and another sensor may be a motion detector.

Network module 617 is the collection of computer software, hardware, and firmware that allows classical computer 102 to communicate with other computers through WAN 113. Network module 617 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 617 are performed on the same physical hardware device. In other embodiments (for example, embodiments that utilize software-defined networking (SDN)), the control functions and the forwarding functions of network module 617 are performed on physically separate devices, such that the control functions manage several different network hardware devices. Computer readable program instructions for performing the inventive methods can typically be downloaded to classical computer 102 from an external computer or external storage device through a network adapter card or network interface included in network module 617.

WAN 113 is any wide area network (for example, the internet) capable of communicating computer data over non-local distances by any technology for communicating computer data, now known or to be developed in the future.

In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 602 is any computer system that is used and controlled by an end user (for example, a customer of an enterprise that operates classical computer 102), and may take any of the forms discussed above in connection with classical computer 102. EUD 602 typically receives helpful and useful data from the operations of classical computer 102. For example, in a hypothetical case where classical computer 102 is designed to provide a recommendation to an end user, this recommendation would typically be communicated from network module 617 of classical computer 102 through WAN 113 to EUD 602. In this way, EUD 602 can display, or otherwise present, the recommendation to an end user. In some embodiments, EUD 602 may be a client device, such as thin client, heavy client, mainframe computer, desktop computer and so on.

Remote server 603 is any computer system that serves at least some data and/or functionality to classical computer 102. Remote server 603 may be controlled and used by the same entity that operates classical computer 102. Remote server 603 represents the machine(s) that collect and store helpful and useful data for use by other computers, such as classical computer 102. For example, in a hypothetical case where classical computer 102 is designed and programmed to provide a recommendation based on historical data, then this historical data may be provided to classical computer 102 from remote database 618 of remote server 603.

Public cloud 604 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 604 is performed by the computer hardware and/or software of cloud orchestration module 620. The computing resources provided by public cloud 604 are typically implemented by virtual computing environments that run on various computers making up the computers of host physical machine set 621, which is the universe of physical computers in and/or available to public cloud 604. The virtual computing environments (VCEs) typically take the form of virtual machines from virtual machine set 622 and/or containers from container set 623. It is understood that these VCEs may be stored as images and may be transferred among and between the various physical machine hosts, either as images or after instantiation of the VCE. Cloud orchestration module 620 manages the transfer and storage of images, deploys new instantiations of VCEs and manages active instantiations of VCE deployments. Gateway 619 is the collection of computer software, hardware, and firmware that allows public cloud 604 to communicate through WAN 113.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 605 is similar to public cloud 604, except that the computing resources are only available for use by a single enterprise. While private cloud 605 is depicted as being in communication with WAN 113 in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 604 and private cloud 605 are both part of a larger hybrid cloud.

Block 601 further includes the software components discussed above in connection with FIGS. 2-5 to train a machine learning model to perform quantum error mitigation on quantum results at runtime with less overhead and without increasing the execution time at runtime. In one embodiment, such components may be implemented in hardware. The functions discussed above performed by such components are not generic computer functions. As a result, classical computer 102 is a particular machine that is the result of implementing specific, non-generic computer functions.

In one embodiment, the functionality of such software components of classical computer 102, including the functionality for training a machine learning model to perform quantum error mitigation on quantum results at runtime with less overhead and without increasing the execution time at runtime, may be embodied in an application specific integrated circuit.

As stated above, current quantum hardware, however, is subject to different sources of noise, the most well-known being qubit decoherence, individual gate errors, and measurement errors. These errors limit the depth of the quantum circuit (i.e., the number of "layers" of quantum gates, executed in parallel, it takes to complete the computation defined by the quantum circuit) that can be implemented. However, even for shallow circuits, noise can lead to faulty estimates. Fortunately, quantum error mitigation provides a collection of tools and methods that allow one to evaluate accurate expectation values (probabilistic expected values of the quantum circuit) from noisy, shallow depth quantum circuits, even before the introduction of fault tolerance. Quantum error mitigation refers to a series of techniques aimed at reducing (mitigating) the errors that occur in quantum computing algorithms. Such techniques involve running additional mitigation circuits or modified target circuits (target circuit is the quantum circuit executed on the quantum computer creating the quantum results). As a result, the use of quantum error mitigation techniques generally results in longer execution times or requires access to additional qubits for increased accuracy. That is, such quantum error mitigation methods trade additional execution time for increased accuracy. An example of a quantum error mitigation technique is probabilistic error cancellation where the noise of the target circuit is learned layer by layer and then cancelled in a probabilistic manner with an exponential overhead to control the subsequent spread in the variance of expectation values. Another example of a quantum error mitigation technique that involves running additional mitigation circuits is zero noise extrapolation. Zero noise extrapolation is an error mitigation technique used to extrapolate the noiseless expectation value (probabilistic expected value of the quantum circuit with zero noise) of an observable from a range of expectation values computed at different noise levels. For example, the noiseless expectation value (also referred to as the "zero-noise" value) is extrapolated by fitting a function (referred to as an "extrapolation function") to the expectation values of the mitigation circuits measured at different noise levels, where the noise has been tuned by noise factors (indicates the "noisiness" of the quantum circuit, such as difference noise levels) achieved by inserting additional digital quantum gates. Unfortunately, such techniques involve considerable overhead while increasing the execution time at runtime.

Figure 7:
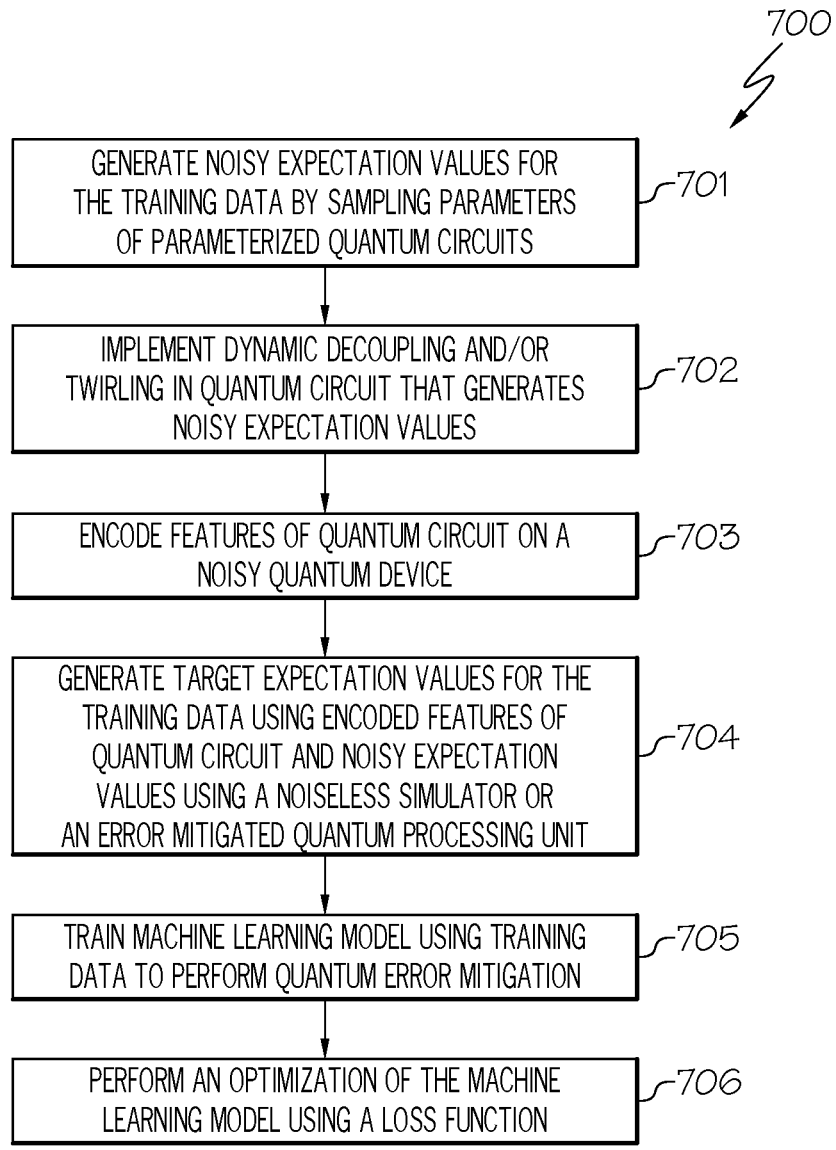
FIG. 7 is a flowchart of a method for training a machine learning model to perform quantum error mitigation on quantum results at runtime in accordance with an embodiment of the present disclosure.
Figure 8:
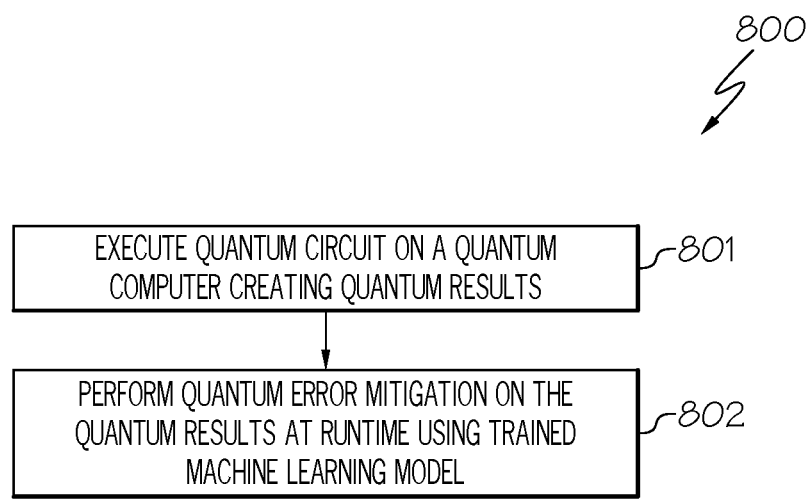
FIG. 8 is a flowchart of a method for performing quantum error mitigation on the quantum results at runtime using the trained machine learning model in accordance with an embodiment of the present disclosure.

The embodiments of the present disclosure provide the means for performing quantum error mitigation with less overhead without increasing the execution time at runtime as discussed below in connection with FIGS. 7-8. FIG. 7 is a flowchart of a method for training a machine learning model to perform quantum error mitigation on quantum results at runtime. FIG. 8 is a flowchart of a method for performing quantum error mitigation on the quantum results at runtime using the trained machine learning model.

As stated above, FIG. 7 is a flowchart of a method 700 for training a machine learning model to perform quantum error mitigation on quantum results at runtime in accordance with an embodiment of the present disclosure.

Referring to FIG. 7, in conjunction with FIGS. 1-6, in step 701, learning estimator 201 of classical computer 102 generates noisy expectation values for the training data to train the machine learning model to perform quantum error mitigation on quantum results at runtime. In one embodiment, learning estimator 201 generates such noisy expectation values by sampling parameters of parameterized quantum circuits with a fixed structure. In one embodiment, such parameterized quantum circuits correspond to quantum circuits that are structurally similar to the target quantum circuit. A target quantum circuit, as used herein, refers to the quantum circuit whose quantum results are to be subject to quantum error mitigation.

As discussed above, in one embodiment, learning estimator 201 generates noisy expectation values by sampling parameters of parameterized quantum circuits with a fixed structure using various software tools, which may include, but are not limited to, Cirq®, Qulacs®, QuCAT, Qiskit®, etc.

In one embodiment, such parameterized circuits are ansatz circuits. An ansatz circuit, as used herein, refers to a circuit with a predetermined circuit geometry and parametrized gates expressing a time-evolution unitary operator. In one embodiment, training such a circuit involves learning the gate parameters through a gradient-descent algorithm where the gradients themselves can be efficiently estimated by the quantum circuit.

For example, using an ansatz circuit, hardware-efficient entangling ansatz may be performed to sample the parameters of parameterized circuits as illustrated in FIG. 3.

As shown in FIG. 3, hardware-efficient entangling ansatz 300 consists of a sequence of single qubit rotation gates 301 and "entangling" 2-qubit gates 302A-302D. As further illustrated in FIG. 3, each qubit gate 301 has an angle, θ, as a parameter.

Furthermore, in one embodiment, the noisy expectation values of the training data are generated by sampling parameters of parameterized circuits using Hamiltonian time evolution, such as Trotterized spin dynamics. In one embodiment, Hamiltonians are hermitian operators that are a sum of a large number of individual Hamiltonians Hj. For example, a Hamiltonian H can be equal to $H_1+H_2$. This sum of 2 Hamiltonians can be described by the Lie product formula: $e^{-t(H_1+H_2)t}=\lim N\to\infty(e^{-iH_1t/N}e^{-iH_2t/N})^N$. Since the limit of this formula is infinite, the series is truncated when implementing this formula on a quantum computer. The truncation introduces error in the simulation that can be bounded by a maximum simulation error ϵ such that $\|e^{-iHt}-U\|\le\epsilon$. This truncation is known as Trotterization. The Trotterization formula is then $e^{-iHt}=(e^{-iH_0t/r}*e^{-iH_1t/r}\cdots *c^{-i\hbar}d-1t/r)^r+0$ (some polynomial factors). Hence, Trotterization can be exploited to mitigate the Trotter error (error in Trotterization) in digital quantum simulation. In one embodiment, Trotterization is exploited to mitigate the Trotter error in digital quantum simulation via spin dynamics (Trotterized spin dynamics), such as spin dynamics of the transverse-field Ising model as illustrated in FIG. 4.

As shown in FIG. 4, FIG. 4 illustrates a quantum circuit 400 for a 6-spin chain of the single Trotter step. A simulation via a product formula proceeds by dividing the total evolution time into a finite number of steps and performing an approximate simulation of exp(–iHt/r)r times. Each simulation of exp(–iHt/r) is called a Trotter step.

In step 702, learning estimator 201 of classical computer 102 implements dynamical decoupling and/or twirling in the quantum circuit that generates the noisy expectation values to make such noise (noisy expectation values) more easily learned. By performing such dynamic decoupling and/or twirling, the effect of the coherent error is reduced. The result of such a procedure is to make the noise model easier to learn by the machine learning model thereby requiring fewer training circuits and enabling generalization of mitigation capabilities from the training set to the more general classes of circuits.

As stated above, dynamic decoupling, as used herein, is an open-loop quantum control technique to exploit fast time-dependent controlled modulation to suppress decoherence. In one embodiment, dynamic decoupling is implemented by a periodic sequence of instantaneous control pulses, the net effect of which is to nearly average to zero undesired system-environment coupling. In one embodiment, learning estimator 201 utilizes various schemes (e.g., Carr-Purcell, Carr-Purcell-Meiboom-Gill) for designing dynamic decoupling protocols with realistic marginal intensity controlled pulses, achieving high-order error suppression, and achieving compatibility between dynamic decoupling and quantum gates thereby extending the coherence time of the qubits.

Twirling, as used herein, is a technique used for converting arbitrary noise channels into Pauli channels in error threshold estimations of quantum error correction codes. That is, twirling is a technique that "twirls" out the irregularity of an arbitrary error channel, turning it into a Pauli error channel.

In one embodiment, learning estimator 201 uses various software tools for implementing dynamic decoupling and/or twirling in the quantum circuit that generates the noisy expectation values which can include, but are not limited to, ADAPT, VAQEM, Qiskit®, etc.

In step 703, learning estimator 201 of classical computer 102 encodes the features of the quantum circuit (quantum circuit used in generating the noisy expectation values) on a noisy quantum device.

As discussed above, in one embodiment, learning estimator 201 is configured to encode information about the quantum circuit on the noisy quantum device. In one embodiment, features of the quantum circuit (quantum circuit used in generating the noisy expectation values) on a noisy quantum device are encoded using vectorization (converting features of the quantum circuit into vectors). For example, features of the quantum circuit (quantum circuit used in generating the noisy expectation values) on a noisy quantum device are encoded using vectorization, such as Word2vec, Doc2Vec, GloVe, etc.

Alternatively, such features of the quantum circuit (quantum circuit used in generating the noisy expectation values) on a noisy quantum device are encoded using a graph. In one embodiment, a graph representing the quantum circuit used in generating the noisy expectation values is generated. Information about the quantum circuit is then encoded as features using the graph. As a result, learning estimator 201 generates a graph representing the quantum circuit used in generating the noisy expectation values, such as shown in FIG. 5.

As shown in FIG. 5, graph 501 of the quantum circuit used in generating the noisy expectation values is represented by various qubits 502 (e.g., $q_0$, $q_1$), quantum gates 503 (e.g., SX, RZ, CX, X, H), measurement gates 504, and resets 505 (reset the quantum bit to its default state). In one embodiment, such elements or components (e.g., quantum gates 503) of graph 501 of the quantum circuit used in generating the noisy expectation values are obtained by converting the circuit to a DAG (directed acyclic graph) using the DAGCircuit function of Qiskit®.

In one embodiment, learning estimator 201 generates such a graph 501 of the quantum circuit used in generating the noisy expectation values using various software tools, which can include, but are not limited to, Azure®, QCVis, Cirq®, etc.

In one embodiment, earning estimator 201 encodes the features of the quantum circuit (see encoded features 506 of FIG. 5) on a noisy quantum device using the graph, such as graph 501 of FIG. 5. Encoding, as used herein, refers to converting the features of the elements (e.g., quantum gates 503) of graph 501 of the quantum circuit (quantum circuit used in generating the noisy expectation values) into a form that is usable for generating the target expectation values (probabilistic expected values of the target quantum circuit). For example, such features that are encoded include the error associated with a quantum gate (e.g., SX), such as the quantum gate error (e.g., 0.001) as illustrated by element 507 of FIG. 5, which describes the scenario in which the actually induced transformation deviates from $|\psi\rangle \mapsto U|\psi\rangle$. Gate errors may result from miscalibration or imperfections in the control hardware and their interactions with the qubits. In another example, such features that are encoded include the operation times of the quantum gates, such as in μs, as illustrated by element 508 of FIG. 5.

As discussed above, in one embodiment, such features are learned and encoded based on simulations performed on the quantum circuit displayed in graph 501.

In one embodiment, learning estimator 201 encodes such features of the quantum circuit on the noisy quantum device by performing simulations of the quantum circuit displayed in graph 501 using various software tools, which can include, but are not limited to, Qiskit®, TensorFlow®, Cirq®, Azure®, etc.

In one embodiment, such features are learned and encoded based on iterating over the nodes in the DAG (directed acyclic graph), such as by using the dag.topological_op_nodes( ) function in Qiskit®. The objects returned are DAGNodes and contain the feature information to be encoded by learning estimator 201.

In step 704, learning estimator 201 of classical computer 102 generates the target expectation values for the training data using the encoded features of the quantum circuit and the noisy expectation values. Target expectation values, as used herein, refer to the probabilistic expected values of the target quantum circuit.

As stated above, in one embodiment, learning estimator 201 generates such target expectation values using a noiseless simulator. That is, such target expectation values are generated by simulators that mimic the behavior of a perfect (noiseless) quantum computer using the encoded features of the quantum circuit and the noisy expectation values. Examples of such noiseless simulators can include, but are not limited to, Intel® Quantum Simulator, Qrack®, staq, qsimcirq package in Cirq®, QuEST®, etc.

In one embodiment, learning estimator 201 generates such target expectation values using an error mitigated quantum processing unit using the encoded features of the quantum circuit and the noisy expectation values. Examples of such quantum processing units that are error mitigated, such as via probabilistic error cancellation and zero noise extrapolation, can include, but are not limited to, Rigetti® 19Q, Google® Bristlecone, Intel® Tangle Lake, IBM Q®. Google® Sycamore, IBM® Eagle, IBM® Osprey, etc.

In step 70S, training engine 202 of classical computer 102 trains a machine learning model using the training data, which includes the target expectation values and the noisy expectation values, to perform quantum error mitigation based on learning the relationships between target and noisy expectation values. That is, such a machine learning model is trained to generate target expectation values based on inputted noisy expectation values. In one embodiment, such machine learning models can include, but are not limited to, a graph neural network model, a multilayer perceptron model, a random forest model, an ordinary least squares model, etc.

As stated above, in one embodiment, the graph neural network model utilizes graph-structured input data with the node and edge features encoding quantum circuit and noise information. In one embodiment, the model consists of multiple layers of message-passing operations, capturing both local and global information within the graph and enabling intricate relationships to be modeled.

In one embodiment, the graph neural network model is utilized for encoding data (e.g., quantum circuits, device noise parameters) into graph structures. In one embodiment, to accomplish data encoding, each quantum circuit is first transpiled into hardware-native gates that adhere to the quantum device's connectivity, and subsequently converted into a directed acyclic graph (DAG). In the graph, each edge signifies a qubit that receives instructions when directed towards a node, while each node corresponds to a gate. These nodes are assigned vectors containing information about the gate type, gate errors as well as the coherence times and readout errors of the qubits on which the gate operates. Additional device and qubit characterizations, such as qubit crosstalk and idling period duration, can be encoded on the edge or node. In one embodiment, the DAG of a quantum circuit, embedded with device and qubit characterizations, is converted into a non-directed acyclic graph and serves as input to the transformer convolution layers of the graph neural network. These message-passing layers iteratively process and aggregate encoded vectors on neighboring nodes and connected 9 edges to update the assigned vector on each node. This enables the exchange of information based on graph connectivity facilitating the extraction of useful information from the nodes which may correspond to the gate sequence. The output, along with the noisy expectation values, is passed through dense layers to generate a graph level prediction, specifically the mitigated expectation values. As a result, after training the layers using backpropagation to minimize the mean squared error between the noisy and ideal expectation values, the graph neural network model learns to perform quantum error mitigation.

In one embodiment, with respect to the multi-layer perceptron model, the model consists of one or more fully-connected layers of neurons. Furthermore, in one embodiment, the model utilizes the same encoding as used for linear regression. Additionally, in one embodiment, the non-linear activation functions enable the approximation of non-linear relationships.

In one embodiment, with respect to the multi-layer perceptron model, nodes within the hidden layers utilize non-linear activation functions, such as the rectified linear unit (ReLU), enabling the multi-layer perceptron model to model non-linear relationships. In one embodiment, the multi-layer perceptron model is constructed with 2 dense layers, a hidden size of 128, the ReLU activation function, and input features identical to those employed in the random forest model (discussed further below).

In one embodiment, to train the multi-layer perceptron model, the mean squared error is minimized between the predicted and true ideal expectation values employing backpropagation to update the neurons. In one embodiment, the batch size is 32, and the optimizer used has an initial learning rate of 0.001. In one embodiment, regularization techniques, such as dropout or weight decay, are used to prevent overfitting.

In one embodiment, the random forest model consists of an ensemble of decision trees and produces a prediction by averaging the predictions from each tree.

In one embodiment, the random forest model, as an ensemble learning method, employs bootstrap aggregating to combine the results produced from many decision trees, which enhances prediction accuracy and mitigates overfitting. Moreover, each decision tree within the random forest utilizes a random subset of features to minimize correlation between trees, further improving prediction accuracy. In one embodiment, the input features to the random forest model are extracted from the quantum circuits and device-specific noise parameters, such as gate counts (parameterized gates are counted in binned angles), gate error rates, and qubit coherence times. In one embodiment, a random forest regressor is trained with a specified large number of decision trees on the training data. Given all the features, the random forest model averages the predictions from all its decision trees to produce an estimate of the ideal expectation value. In one embodiment, 300 tree estimators are used for each observable. In one embodiment, the tree construction process follows a top-down, recursive, and greedy approach, using the Classification and Regression Trees (CART) algorithm. For the splitting criterion, the mean squared error reduction is employed for regressions. Furthermore, in one embodiment, for each tree, at least 2 samples are used to split an internal node, and 1 feature is considered when looking for the best split.

In one embodiment, with respect to linear regression methods, such as the ordinary least squares model, the input features may correspond to vectors, including circuit features, such as the number of two-qubit gates and SX gates, noisy expectation values, and observables. In one embodiment, the ordinary least squares model consists of a linear function that maps input features to mitigated values.

In one embodiment, such a linear regression model, such as the ordinary least squares model, where the relationship between a dependent variable (the ideal expectation value) and one or more independent variables (the features extracted from quantum circuits) is modeled using a linear function.

In one embodiment, the ordinary least squares model extends the feature set to include gate counts where parameterized gates are binned by their parameter. Secondly, the ordinary least squares model does not necessarily require training on Clifford versions of the target circuits, although this option remains available if desired. Instead, the linear regression model is trained which takes these features as input and predicts the ideal expectation values. The model minimizes the sum squared error between the mitigated and the ideal expectation values using a closed-form solution, which is named ordinary least squares (OLS). The linear regression model can also be trained using other methods, such as ridge regression, least absolute shrinkage and selection operator (LASSO), or elastic net. These methods differ in their regularization techniques, which can help prevent overfitting and improve model generalization.

Furthermore, as discussed above, in one embodiment, training engine 202 builds and trains a machine learning model to perform quantum error mitigation on quantum results at runtime.

In one embodiment, the model is trained to perform quantum error mitigation on quantum results at runtime based on a sample data set that includes the target expectation values and the noisy expectation values. Such a sample data set may be stored in a data structure (e.g., table) residing within the storage device (e.g., storage device 611, 615) of classical computer 102. In one embodiment, such a data structure is populated with the training data discussed above.

Furthermore, in one embodiment, the sample data set discussed above is used by a machine learning algorithm to make predictions or decisions as to the quantum error mitigation to be performed on quantum results at runtime. The algorithm iteratively makes predictions on the sample data set as to the quantum error mitigation to be performed on quantum results at runtime until the predictions achieve the desired accuracy as determined by an expert. Examples of such learning algorithms include nearest neighbor, Naïve Bayes, decision trees, linear regression, support vector machines, and neural networks.

In step 706, optimization engine 203 of classical computer 102 performs an optimization of the machine learning model, such as by using a loss function, to improve the performance of the machine learning model.

As stated above, a loss function measures the difference between the predicted output of a model and the actual output, such as for each training sample. Optimization engine 203 is then configured to adjust the model's parameters to minimize the loss function. Examples of such loss functions can include, but are not limited to, mean squared error (calculates the average squared difference between the predicted output and the actual output), mean absolute error (measures the average absolute difference between the predicted and true values), cross-entropy (measures the dissimilarity between the predicted probability distribution and the actual probability distribution), etc. Examples of such optimizers used by optimization engine 203 to perform such optimization (adjust the model's parameters to minimize the loss function) can include, but are not limited to, gradient descent (adjusts the model's parameters by taking the derivative of the loss function with respect to the parameters and updating the parameters in the direction of the negative gradient), stochastic gradient descent (updates the model's parameters after each training sample, rather than after each epoch), adaptive moment estimation (uses the first and second moments of the gradients to adjust the learning rate adaptively), etc.

In one embodiment, the machine learning model is trained by optimization engine 203 by minimizing a loss function capturing the difference between the predicted mitigated and ideal expectation values computed with a noiseless simulator.

Upon training the machine learning model to perform quantum error mitigation, such a trained machine learning model may be used to perform quantum error mitigation on quantum results at runtime as discussed below in connection with FIG. 8.

FIG. 8 is a flowchart of a method 800 for performing quantum error mitigation on the quantum results at runtime using the trained machine learning model in accordance with an embodiment of the present disclosure.

Referring to FIG. 8, in conjunction with FIGS. 1-7, in step 801, accelerator engine 204 of classical computer 102 executes a quantum circuit on a quantum computer, such as quantum computer 101, creating quantum results.

In step 802, accelerator engine 204 of classical computer 102 performs quantum error mitigation on the quantum results, which include noisy expectation values, at runtime using the trained machine learning model.

As discussed above, for example, based on the quantum results which include noisy expectation values, the trained machine learning model is configured to output mitigated expectation values. Accelerator engine 204 may perform such quantum error mitigation on the quantum results at runtime involving various applications, such as quantum tomography, which characterizes the complete quantum state of a particle or particles through a series of measurements in different bases, and the variational quantum eigensolver, which is a quantum algorithm for quantum chemistry, quantum simulations, and optimization problems.

By performing quantum error mitigation in such a manner, there are significant savings in quantum execution time while improving the accuracy of the results without additional mitigation circuits at runtime. Furthermore, the approach of the present disclosure offers a path to scalability, is noise-model agnostic, and is able to accommodate application-specific requirements of accuracy and generalizability. Additionally, using the approach of the present disclosure, a user may execute fewer quantum circuits and still obtain accurate, error-mitigated expectation values using pre-loaded machine learning models, or, alternatively, such users can train their own machine learning models.

Furthermore, the principles of the present disclosure improve the technology or technical field involving quantum error mitigation techniques.

As discussed above, current quantum hardware, however, is subject to different sources of noise, the most well-known being qubit decoherence, individual gate errors, and measurement errors. These errors limit the depth of the quantum circuit (i.e., the number of "layers" of quantum gates, executed in parallel, it takes to complete the computation defined by the quantum circuit) that can be implemented. However, even for shallow circuits, noise can lead to faulty estimates. Fortunately, quantum error mitigation provides a collection of tools and methods that allow one to evaluate accurate expectation values (probabilistic expected values of the quantum circuit) from noisy, shallow depth quantum circuits, even before the introduction of fault tolerance. Quantum error mitigation refers to a series of techniques aimed at reducing (mitigating) the errors that occur in quantum computing algorithms. Such techniques involve running additional mitigation circuits or modified target circuits (target circuit is the quantum circuit executed on the quantum computer creating the quantum results). As a result, the use of quantum error mitigation techniques generally results in longer execution times or requires access to additional qubits for increased accuracy. That is, such quantum error mitigation methods trade additional execution time for increased accuracy. An example of a quantum error mitigation technique is probabilistic error cancellation where the noise of the target circuit is learned layer by layer and then cancelled in a probabilistic manner with an exponential overhead to control the subsequent spread in the variance of expectation values. Another example of a quantum error mitigation technique that involves running additional mitigation circuits is zero noise extrapolation. Zero noise extrapolation is an error mitigation technique used to extrapolate the noiseless expectation value (probabilistic expected value of the quantum circuit with zero noise) of an observable from a range of expectation values computed at different noise levels. For example, the noiseless expectation value (also referred to as the "zero-noise" value) is extrapolated by fitting a function (referred to as an "extrapolation function") to the expectation values of the mitigation circuits measured at different noise levels, where the noise has been tuned by noise factors (indicates the "noisiness" of the quantum circuit, such as difference noise levels) achieved by inserting additional digital quantum gates. Unfortunately, such techniques involve considerable overhead while increasing the execution time at runtime.

Embodiments of the present disclosure improve such technology by generating training data, which includes noisy expectation values and target expectation values (noiseless expectation values). A machine learning model is then trained using the training data to perform quantum error mitigation based on learning the relationships between target and noisy expectation values. That is, such a machine learning model is trained to generate target expectation values based on inputted noisy expectation values. In one embodiment, such machine learning models can include, but are not limited to, a graph neural network model, a multi-layer perceptron model, a random forest model, an ordinary least squares model, etc. Upon executing a quantum circuit on a quantum computer creating quantum results, quantum error mitigation is performed on the quantum results at runtime using the trained machine learning model. In this manner, there are significant savings in quantum execution time while improving the accuracy of the results in performing quantum error mitigation on quantum results at runtime without additional mitigation circuits. Furthermore, in this manner, there is an improvement in the technical field involving quantum error mitigation techniques.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for runtime quantum error mitigation, the method comprising:
    generating training data;
    training a machine learning model using said generated training data to perform quantum error mitigation;
    performing an optimization of said machine learning model using a loss function;
    executing a quantum circuit on a quantum computer creating quantum results; and
    performing quantum error mitigation on said quantum results at runtime using said trained quantum machine learning model.

2. The method as recited in claim 1 further comprising:
    generating noisy expectation values for said training data by sampling parameters of parameterized circuits with a fixed structure.

3. The method as recited in claim 2, wherein said parameterized circuits are ansatz circuits.

4. The method as recited in claim 2, wherein said noisy expectation values of said training data are generated by sampling parameters of parameterized circuits using parameterized Hamiltonian time evolution.

5. The method as recited in claim 2 further comprising:
    implementing dynamic decoupling and/or twirling in a quantum circuit that generates said noisy expectation values.

6. The method as recited in claim 5 further comprising:
    encoding features of said quantum circuit on a noisy quantum device.

7. The method as recited in claim 6 further comprising:
    generating said target expectation values using said noisy expectation values and said encoded features, wherein said training data comprises said target expectation values generated using a noiseless simulator or an error mitigated quantum processing unit.

8. The method as recited in claim 1, wherein said machine learning model is selected from the group consisting of a graph neural network model, a multilayer perceptron model, a random forest model, and an ordinary least squares model.

9. The method as recited in claim 1 further comprising:
    training said machine learning model using said generated training data to perform quantum error mitigation based on learning relationships between target and noisy expectation values.

10. A computer program product for runtime quantum error mitigation, the computer program product comprising one or more computer readable storage mediums having program code embodied therewith, the program code comprising programming instructions for:
    generating training data;
    training a machine learning model using said generated training data to perform quantum error mitigation;
    performing an optimization of said machine learning model using a loss function;
    executing a quantum circuit on a quantum computer creating quantum results; and
    performing quantum error mitigation on said quantum results at runtime using said trained quantum machine learning model.

11. The computer program product as recited in claim 10, wherein the program code further comprises the programming instructions for:
    generating noisy expectation values for said training data by sampling parameters of parameterized circuits with a fixed structure.

12. The computer program product as recited in claim 11, wherein said parameterized circuits are ansatz circuits.

13. The computer program product as recited in claim 11, wherein said noisy expectation values of said training data are generated by sampling parameters of parameterized circuits using parameterized Hamiltonian time evolution.

14. The computer program product as recited in claim 11, wherein the program code further comprises the programming instructions for:
    implementing dynamic decoupling and/or twirling in a quantum circuit that generates said noisy expectation values.

15. The computer program product as recited in claim 14, wherein the program code further comprises the programming instructions for:
    encoding features of said quantum circuit on a noisy quantum device.

16. The computer program product as recited in claim 15, wherein the program code further comprises the programming instructions for:
    generating target expectation values using said noisy expectation values and said encoded features, wherein said training data comprises said target expectation values generated using a noiseless simulator or an error mitigated quantum processing unit.

17. The computer program product as recited in claim 10, wherein said machine learning model is selected from the group consisting of a graph neural network model, a multilayer perceptron model, a random forest model, and an ordinary least squares model.

18. The computer program product as recited in claim 10, wherein the program code further comprises the programming instructions for:
    training said machine learning model using said generated training data to perform quantum error mitigation based on learning relationships between target and noisy expectation values.

19. A system, comprising:
    a memory for storing a computer program for runtime quantum error mitigation; and
    a processor connected to said memory, wherein said processor is configured to execute program instructions of the computer program comprising:
    generating training data;
    training a machine learning model using said generated training data to perform quantum error mitigation;
    performing an optimization of said machine learning model using a loss function;
    executing a quantum circuit on a quantum computer creating quantum results; and performing quantum error mitigation on said quantum results at runtime using said trained quantum machine learning model.

20. The system as recited in claim 19, wherein the program instructions of the computer program further comprise:

generating noisy expectation values for said training data by sampling parameters of parameterized circuits with a fixed structure.

21. The system as recited in claim 20, wherein said parameterized circuits are ansatz circuits.

22. The system as recited in claim 20, wherein said noisy expectation values of said training data are generated by sampling parameters of parameterized circuits using parameterized Hamiltonian time evolution.

23. The system as recited in claim 20, wherein the program instructions of the computer program further comprise:

implementing dynamic decoupling and/or twirling in a quantum circuit that generates said noisy expectation values.

24. The system as recited in claim 23, wherein the program instructions of the computer program further comprise:

encoding features of said quantum circuit on a noisy quantum device.

25. The system as recited in claim 24, wherein the program instructions of the computer program further comprise:

generating target expectation values using said noisy expectation values and said encoded features, wherein said training data comprises said target expectation values generated using a noiseless simulator or an error mitigated quantum processing unit.

* * * * *